(12) United States Patent
Allinson et al.

(10) Patent No.: US 11,574,331 B2
(45) Date of Patent: Feb. 7, 2023

(54) METHOD AND SYSTEM FOR SHARING PERSONAL INFORMATION WITH WEB SITES

(71) Applicant: Oath Inc., New York, NY (US)

(72) Inventors: Richard Allinson, Morgan Hill, CA (US); Annamalai Muruganathan, San Jose, CA (US); Matthew Jones, San Francisco, CA (US)

(73) Assignee: YAHOO ASSETS LLC, Dulles, VA (US)

(*) Notice: Subject to any disclaimer, the term of this patent is extended or adjusted under 35 U.S.C. 154(b) by 1150 days.

(21) Appl. No.: 14/861,973

(22) Filed: Sep. 22, 2015

(65) Prior Publication Data
US 2017/0083931 A1 Mar. 23, 2017

(51) Int. Cl.
H04L 29/08 (2006.01)
G06Q 30/02 (2012.01)

(52) U.S. Cl.
CPC .............. *G06Q 30/0224* (2013.01)

(58) Field of Classification Search
CPC ................. G06F 21/6227; G06Q 30/0224
USPC ............................................. 707/784
See application file for complete search history.

(56) References Cited

U.S. PATENT DOCUMENTS

| | | | | |
|---|---|---|---|---|
| 2002/0194502 A1* | 12/2002 | Sheth | ............... | G06F 17/30873 726/4 |
| 2009/0031245 A1* | 1/2009 | Brezina | ............... | H04M 15/00 715/781 |
| 2010/0223349 A1* | 9/2010 | Thorson | ............... | H04L 51/212 705/347 |
| 2011/0126290 A1* | 5/2011 | Krishnamurthy | ..... | G06F 21/577 726/26 |
| 2011/0137946 A1* | 6/2011 | Siress | ............... | G06F 21/6227 707/784 |
| 2012/0304265 A1* | 11/2012 | Richter | ............... | H04L 63/102 726/7 |
| 2013/0318199 A1* | 11/2013 | Le Jouan | ............... | H04L 67/53 709/217 |
| 2015/0169692 A1* | 6/2015 | Klingen | ............... | G06F 16/25 707/722 |

OTHER PUBLICATIONS

Berners-Lee, T., RFC 1945—Hypertext Transfer Protocol—HTTP/1.0. Network Working Group, Internet Engineering Task Force (IETF), May 1996. [online], [retrieved on Jan. 16, 2020], Retrieved from the Internet <URL: https://tools.ietf.org/html/rfc1945>.*
Henning Olesen, Accessing and Disclosing Protected Resources: A User-Centric View , 2015, p. 2, IEEE (Year: 2015).*
Google Analytics—turn insights into action, downloaded from http://www.google.com/analytics/ last updated May 27, 2015.
Davenport, Thomas H., "Analytics 3.0," Harvard Business Review, Dec. 2013, downloaded from https://hbr.org/2013/12/analytics-30.

* cited by examiner

*Primary Examiner* — Abhishek Vyas
*Assistant Examiner* — Darnell A Pouncil
(74) *Attorney, Agent, or Firm* — Cooper Legal Group LLC

(57) ABSTRACT

In one embodiment, a user of a client device may selectively share personal data with web companies. The personal data may be shared directly via transmission by the client device to the web companies. Alternatively, the personal data may be shared with the web companies via a personal data sharing system that collects and maintains personal data associated with users. The personal data sharing system may reward the user for sharing their personal data with the web companies.

20 Claims, 5 Drawing Sheets

METHOD AND SYSTEM FOR SHARING PERSONAL INFORMATION WITH WEB SITES

BACKGROUND OF THE INVENTION

The disclosed embodiments relate generally to computer-implemented methods and apparatus for sharing personal information.

Most Internet users browse online without concern for their electronic privacy. However, web sites can collect a vast amount of personal information on Internet users. For example, web sites may obtain information such as the location, name, email address, and shopping habits of users. Often, web sites acquire this information through Internet Protocol (IP) addresses or Web browser cookies.

Personal information collected by web sites is extremely valuable. Web sites may use the personal information they acquire to develop new products, as well as guide marketing decisions for existing products. Without access to this personal information, many companies would struggle to determine the interests and preferences of their online audience and customers.

SUMMARY OF THE INVENTION

In accordance with various embodiments, a user of a client device may selectively share personal data with web companies. The personal data may be shared directly via transmission by the client device to the web companies. Alternatively, the personal data may be shared with the web companies via an entity that collects and maintains personal data associated with users. The entity may be referred to as a personal data sharing system. The personal data sharing system may include a web company, web site, and/or server(s) that implement a personal data sharing service.

A user may be rewarded for sharing their personal data with the web companies. Such rewards may include, but are not limited to, discounts, coupons, monetary compensation, points, products, and/or services.

In one embodiment, a personal data sharing system may receive a personal information query requesting one or more personal information items associated with a user identifier from a requestor. The system may determine whether the requestor is authorized to obtain the one or more personal information items associated with the user identifier. The system may provide the one or more personal information items associated with the user identifier to the requestor in response to the personal information query according to whether the requestor is authorized to obtain the one or more personal information items.

In another embodiment, a server associated with a web site may receive a request for a web page from a client device, where the request for the web page includes a user identifier and an indication that the client device is authorizing the web site to obtain one or more personal items associated with the user identifier from a personal data sharing system that maintains personal information associated with users. A personal information query may be transmitted to the personal data sharing system, where the personal information query includes the user identifier and an indication that the client device has authorized the web site to obtain one or more personal information items associated with the user identifier from the personal data sharing system. The personal information items associated with the user identifier may be received from the personal data sharing system in response to the personal information query. Information including at least a portion of the one or more personal information items may be stored in association with the user identifier. Content may be transmitted from the web site to the client device in response to the request for the web page.

In another embodiment, a browser of a client device may access a personal data sharing configuration, where the personal data sharing configuration pertains to sharing of personal information of one or more users of the client device with other web sites in exchange for compensation from a personal data sharing system. The browser of the client device may compose a request for a web page associated with a web site based, at least in part, on the personal data sharing configuration. The browser of the client device may transmit the request for the web page. The client device may receive content in response to the request for the web page.

In another embodiment, a browser of a client device may compose a request for a web page associated with a web site according to a personal data sharing configuration of the browser. The request for the web page may include a user identifier and an indication that the client device is authorizing the web site to obtain one or more personal information items associated with the user identifier from a personal data sharing system that maintains personal information associated with a plurality of users. The browser of the client device may transmit the request for the web page to the web site. The browser of the client device may receive content from the web site in response to the request for the web page. A user of the client device may receive from the personal data sharing system a benefit in exchange for the personal information items obtained by the web site from the personal data sharing system.

In yet another embodiment, a client device may determine that a web site has an established relationship with a personal data sharing system that provides compensation in exchange for personal information shared by the client device with the web site. The client device may transmit a request for a web page associated with the web site, a user identifier, and one or more personal information items associated with the user identifier to the web site. The client device may receive content from the web site in response to the request for the web page. A user of the client may receive from the personal data sharing system a benefit in exchange for the personal information items provided by the client device to the web site.

In yet another embodiment, a device includes a processor, memory, and a display. The processor and memory are configured to perform one or more of the disclosed method operations. In another embodiment, a computer readable storage medium has computer program instructions stored thereon that are arranged to perform one or more of the disclosed method operations.

These and other features and advantages will be presented in more detail in the following specification and the accompanying figures which illustrate by way of example various embodiments.

DETAILED DESCRIPTION OF THE SPECIFIC EMBODIMENTS

Figure 1:
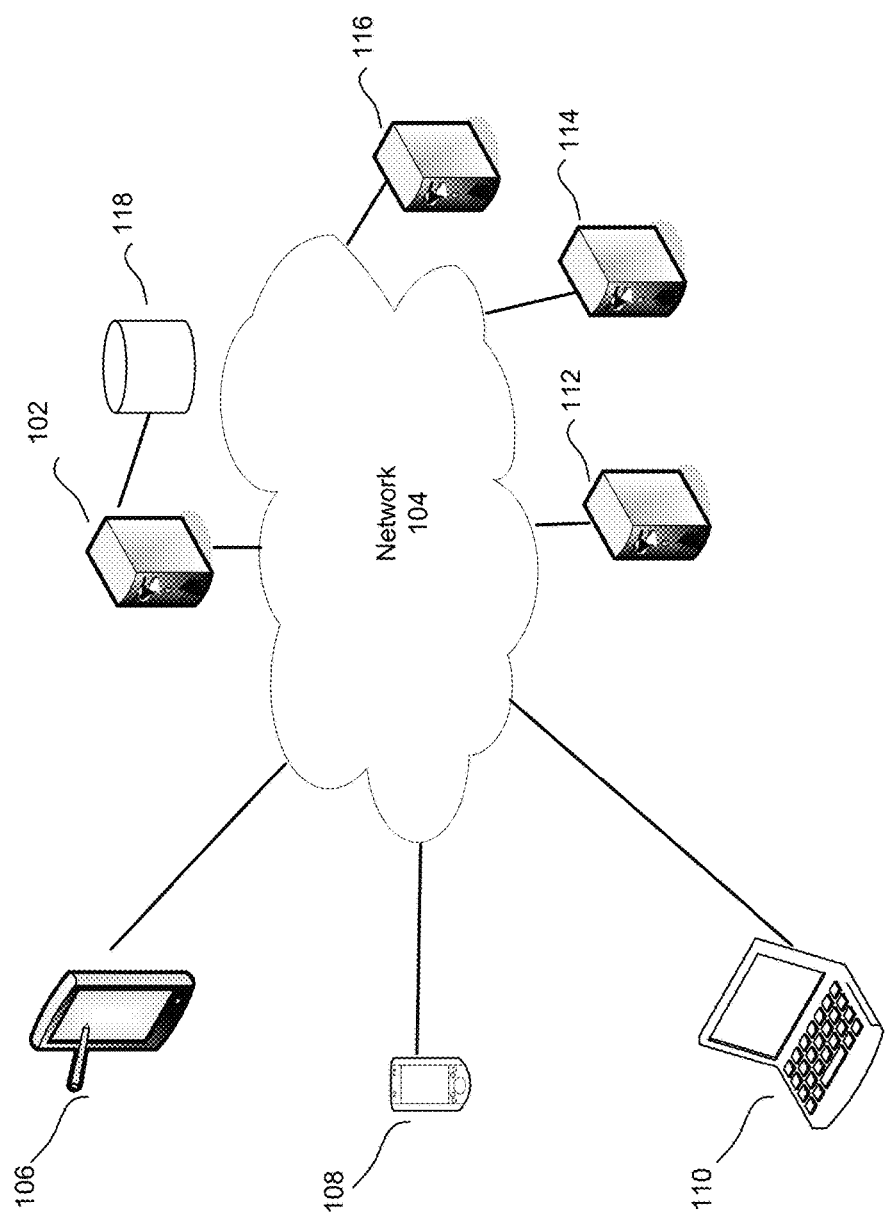
FIG. 1 is a diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Many web sites collect vast amounts of personal information as users browse the Internet. The personal information is typically collected without consent from the Internet users. Unfortunately, the current manner in which personal information is collected by web sites does not enable users to selectively share their personal information.

The disclosed embodiments enable Internet users to selectively share their personal information with web sites that they access. As a result, users may control which entities will receive their personal information. In addition, users may further control which aspects of their personal information they will share.

In some embodiments, personal information may be shared via a third party entity such as an analytics company that collects and maintains personal information associated with Internet users. In other embodiments, personal information may be shared directly by Internet users with web sites that they access.

Typically, personal information of Internet users is acquired automatically without compensating the users for the information that has been collected. In accordance with various embodiments, Internet users may be compensated for sharing their personal information. More particularly, the third party entity may provide monetary compensation or other form of compensation to Internet users in exchange for sharing their personal information with web sites.

FIG. 1 is a diagram illustrating an example system in which various embodiments may be implemented. The disclosed embodiments may be implemented in some centralized manner. This is represented in FIG. 1 by server(s) 102, which may correspond to multiple distributed devices and data store(s). The server(s) 102 and/or corresponding data store(s) may store user account data, user information, and/or content.

The server(s) 102 may be associated with a web site that provides a variety of services to its users. More particularly, the server(s) 102 may include a web server, search server, and/or content server. As will be described in further detail below, the web site may be associated with a company that provides compensation to users that share their personal information with other web sites.

A plurality of clients 106, 108, 110 may access a web service on a web server via a network 104. The client devices 106, 108, 110 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The network 104 may take any suitable form, such as a wide area network or Internet and/or one or more local area networks (LAN's). The network 104 may include any suitable number and type of devices, e.g., routers and switches, for forwarding search or web object requests from each client to a search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Implementations are contemplated in which users interact with a diverse network environment. For example, the network 104 may include a variety of networks, such as a local area network (LAN) or wide area network (WAN).

In accordance with various embodiments, users of the clients 106, 108, 110 may register via the server(s) 102 with a personal data sharing service offered by the web site. Such registration may be accomplished using user identifier(s) and/or client identifier(s). Users who have registered with the personal data sharing service may receive benefits from the web site in exchange for providing their personal information to web sites of other web companies. More particularly, the web company web sites 112, 114, 116 may each be implemented via one or more corresponding servers. The personal information may be provided by the clients 106, 108, 110 via the network 104 to the web sites 112, 114, 116. Alternatively, the personal information may be provided by the personal data sharing service from the server(s) 102 via the network 104 to the web sites 112, 114, 116.

In accordance with various embodiments, the web companies may establish a contractual relationship with the personal sharing data service. More particularly, the web companies may agree to pay the personal data sharing service for personal information of users that have registered with the personal data sharing service. As set forth above, the personal information may be received by the web companies directly from the clients 106, 108, 110 or from the personal data sharing service via the network 104.

In accordance with various embodiments, completion of registration with the personal data sharing service authorizes the web site to collect personal information associated with the users' activities on the Internet and share the personal information with requesting web sites. Once the users have registered with the personal data sharing service, the server(s) 102 may collect personal information as the clients 106, 108, 110 interact with the web site or browse the Internet. The sharing of personal information may be performed according to data sharing preferences that have been established. The data sharing preferences may be provided by the user on a case-by-case basis, established via account settings, and/or configured via browser settings.

In accordance with various embodiments, the clients 106, 108, 110 may install applications from a server via the network 104. In addition, the clients 106, 108, 110 may open or otherwise access applications installed on the clients 106, 108, 110. More particularly, the clients 106, 108, 110 may install an application or web browser that enables users to configure the browser to operate according to a desired personal data permission configuration. For example, the application may be a plug-in (i.e., extension) that adds features such as those described herein to an existing web browser installed on the clients 106, 108, 110. Example operations that may be performed by a web browser or associated plug-in will be described in further detail below.

As the clients 106, 108, 110 browse the Internet or access various web sites, the browser may operate according to the personal data permission configuration. More particularly, the clients 106, 108, 110 may send personal data to the web sites 112, 114, 116. Alternatively, the clients 106, 108, 110 may transmit key(s), token(s), or other value(s) to the web sites 112, 114, 116 that enable the web sites 112, 114, 116 to request and obtain personal data items for a specific client and/or user from the web site via the server(s) 102. Thus, web sites 112, 114, 116 to which the clients 106, 108, 110 browse may obtain personal data from the clients 106, 108, 110 or from the server(s) 102.

In addition, the browser may be configured to send personal data to the server(s) 102 for storage. More particularly, the personal data permission configuration may indicate that specific type(s) of personal data items are to be sent to the server(s) 102 of the personal data sharing system for storage. The types of personal data items may include, but are not limited to, an identity of a visited web site (e.g., URL), time spent on the visited web site, products purchased via the visited web site, and/or summary of personal data that has been transmitted directly by a client to the visited web site. The configuration may indicate that the personal data items are to be transmitted to the server(s) after browsing away from a visited web site, or periodically after expiration of a particular period of time. Therefore, the server(s) 102 may receive and store personal data that has been provided to the server(s) 102 by the clients 106, 108, 110.

A personal data permission configuration may be established for a device, a browser (e.g., to be applied to all users of the browser), and/or a specific user. For example, a personal data permission configuration may be associated with a particular user identifier. In addition, a personal data permission configuration may be established for all domains or in association with specific domain(s). Moreover, a personal data permission configuration may specify or otherwise indicate personal information item(s) to be provided to a web site. In some embodiments, a personal data permission configuration may further indicate whether personal information item(s) are to be provided to a web site by the client device or by a third party (e.g., in response to a request from the web site). Example personal information items include, but are not limited to, gender, age, address, browsing history, purchase history, search history, and/or summaries thereof. Personal information may be maintained in a user profile, as will be described in further detail below.

The server(s) 102 may provide compensation to users that choose to share their personal information with web sites that they access. In some embodiments, the personal information may be shared with the web sites by the server(s) 102. In other embodiments, the personal information may be shared with the web sites directly by the clients 106, 108, 110. Where the clients 106, 108, 110 share personal information directly with web sites 112, 114, 116, the clients 106, 108, 110 may provide proof that they have shared their personal information to the server(s) 102 so that they may receive compensation from the web site via the server(s) 102.

The server(s) 102 may collect personal data as the clients 106, 108, 110 browse the Internet. In some embodiments, the personal data may be transmitted by the clients 106, 108, 110 to the server(s) 102 for storage. In this manner, the clients 106, 108, 110 may control the personal information that is collected by the server(s) 102.

The personal data may be maintained in the form of user profiles (or portion thereof), which may also be referred to as user accounts. More particularly, each user profile may be associated with a client device and/or specific user of the client device. For example, a user may use a user identifier to register with the server(s) 102 to receive benefits associated with sharing their personal information. Examples of personal data that may be collected and maintained by the server(s) will be described in further detail below.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

A user profile may further include additional data associated with the user. For example, the user profile may indicate locations from which the user has browsed the Internet.

In addition, a user profile may include an account balance that indicates the amount of compensation that the user has accrued as a result of sharing personal data with other web companies 112, 114, 116. For example, the account balance may represent a monetary value, specific coupons or discounts that have been awarded, specific services or products that have been earned, and/or a number of points that may be redeemed.

In accordance with various embodiments, a user profile may be associated with one or more client devices. Conversely, each client device may be associated with a set of one or more users, enabling user profile(s) associated with the client device to be identified.

A user profile or portion thereof may be stored locally on a client device and/or remotely at a remotely located server. In addition, a user profile or information from a user profile may be transmitted or otherwise shared between a client device and the remotely located server. Thus, the server(s) 102 may have access to a plurality of user profiles.

Figure 2:
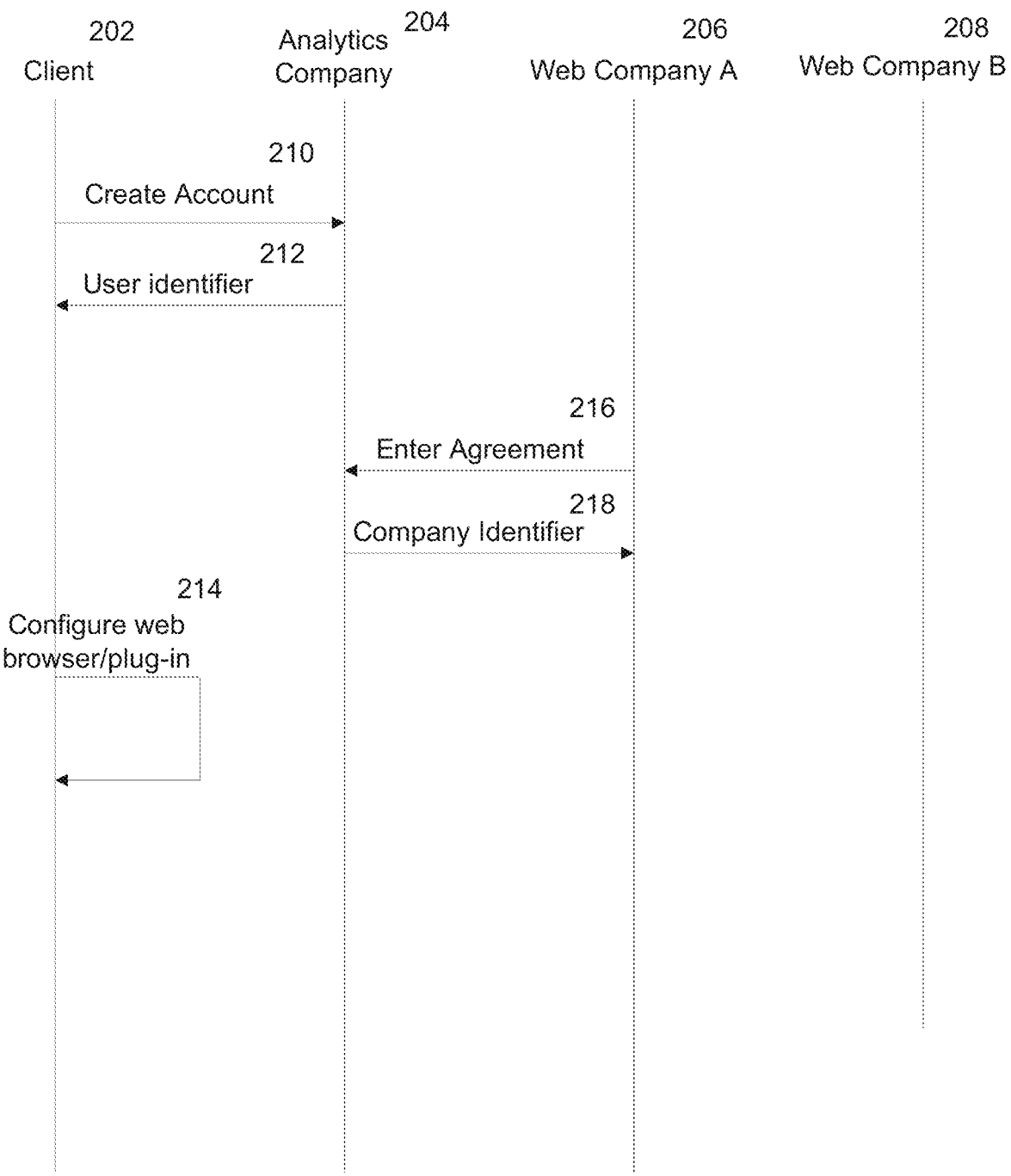
FIG. 2 is a transaction flow diagram illustrating an example method of establishing user and company accounts with an analytics company in accordance with various embodiments.

FIG. 2 is a transaction flow diagram illustrating an example method of establishing user and company accounts with an analytics company in accordance with various embodiments. Operations performed with respect to a client device, an entity offering a personal data sharing service (e.g., web analytics company), web company A, and web company B will be described with reference to vertical lines 202, 204, 206, and 208, respectively. Operations performed by the client device 202 may be implemented by a web browser or associated plug in. The entity (e.g., personal data sharing system) offering the personal data sharing service 204 may include a web site that offers personal data sharing services such as those described herein, while the web companies 206 and 208 may each include a corresponding web site. The terms "web company" and "web site" may be used interchangeably. To simplify the description, the entity 204 will be referred to as an analytics company in the following examples.

A user may enter into an agreement with the analytics company 204 by creating an account with the analytics company 204. Through such an agreement, the user may receive compensation from the analytics company 204 in exchange for personal information item(s) that are shared with other web site(s). In some embodiments, the analytics company 204 may pay the user based, at least in part, on the amount and/or quality of personal data shared by the user. For example, the analytics company 204 may pay one cent to a user who provides their gender to a web site that the user visits, and pay 5 cents to a user who provides their gender, age, and interests to a web site that the user visits. In addition, the analytics company 204 may pay the user based, at least in part, on the number of page views the visited web site receives. In some embodiments, the analytics company collects personal information associated with the user and distributes that information according to the user's preferences, as will be described in further detail below with reference to FIG. 3. In other embodiments, the personal information may be collected and distributed by a client device, as will be described in further detail below with reference to FIG. 4.

In this example, the user establishes an account at 210 with the analytics company 204 via the client device 202. However, in other embodiments, the user may establish the account via another client device. In other words, the account need not be established via the same client device via which data sharing with other web sites is facilitated.

The account may be associated with one or more users and/or one or more client devices. For example, account information of the account may include a user identifier associated with the user and/or a client device identifier. The client device identifier may include a media access control (MAC) address, an Internet Protocol (IP) address, and/or a browser identifier associated with a browser of the client device.

The account information may further include a data sharing configuration defining the type(s) of information that the user is willing to share with other web sites. For example, the user may be willing to share their gender, age, and browsing history, but not their address. In addition, the data sharing configuration may indicate the web sites with which the user is willing to share their personal information. The type(s) of information may be associated with specific web site(s) or may be applied on a global level to all web sites that the user visits.

In accordance with various embodiments, the account information may indicate that the data sharing configuration is or will be established via the client device. More particularly, the data sharing configuration may be established via a web browser or associated plug-in.

The analytics company 204 may provide a confirmation at 212 to the user that the account has been established. In addition, the analytics company may provide the user or client device 202 with credentials that may be used to configure the web browser or associated plug-in. For example, the credentials may include a user identifier.

In some embodiments, the web browser or associated plug-in may be configured at 214 with a data sharing configuration such as that described above. The data sharing configuration may be applied globally to all users of the client device 202 or specific user(s) identified by corresponding user identifiers. In addition, the data sharing configuration may indicate which personal information item(s) of the user(s) will be shared with which web site domains.

The analytics company 204 or the client device 202 may obtain a data sharing configuration such as that described above by providing a graphical user interface via the client device 202. The graphical user interface may include a representation of a plurality of types of personal items, where the types of personal items are selectable by a user. A selection of at least a subset of the plurality of types of personal items may be received via the client device. An indication of the selected subset of the plurality of types of personal items may be stored as a data sharing configuration at the client device and/or the analytics company 204.

As described above, the data sharing configuration may be stored in association with specific user(s), client device(s), and/or domain(s). Thus, the user may specify or select specific user(s), client device(s), and/or domain(s) to whom the data sharing configuration applies.

In addition, the web company 206 may enter a contractual agreement at 216 with the analytics company 204. For example, the web company 206 may establish an online company account. The contractual agreement may specify an amount that the web company 206 will pay the analytics company 204 and/or user for specific types of personal information. For example, the web company 206 may agree to pay a fraction of a cent for receiving the gender and/or age of a user visiting the web site of the web company 206. As another example, the web company 206 may agree to pay one cent for receiving the gender, age, and interests of a user visiting the web site of the web company 206. In some embodiments, the web company 206 may pay the analytics company 204 based, at least in part, on the number of page views received by its web site. In accordance with various embodiments, the web company 206 may fetch personal information items of users of the analytics company 204 from a web site of the analytics company 204 per the contractual agreement.

The web company 206 may confirm the contractual agreement at 218 by providing the web company 206 with credentials that may be used in further communications with the analytics company 204. For example, the analytics company 204 may provide the web company 206 with a company identifier. As shown in this example, web company B 208 does not enter into an agreement with the analytics company 204.

In accordance with various embodiments, the analytics company 204 may collect and maintain personal data that may be requested by other web companies. More particularly, the personal data may be maintained in user profiles such as those described above. A web company may be given permission by the client device 202 to fetch the personal data at the time that the client device 202 accesses the web company web site. More particularly, the type(s) of information the user is willing to share with the web company and credentials for retrieving the user's personal information from the personal data sharing service of the analytics company 202 may be indicated in a communication transmitted to the web company by the client device, as will be described in further detail below with reference to FIG. 3.

Figure 3:
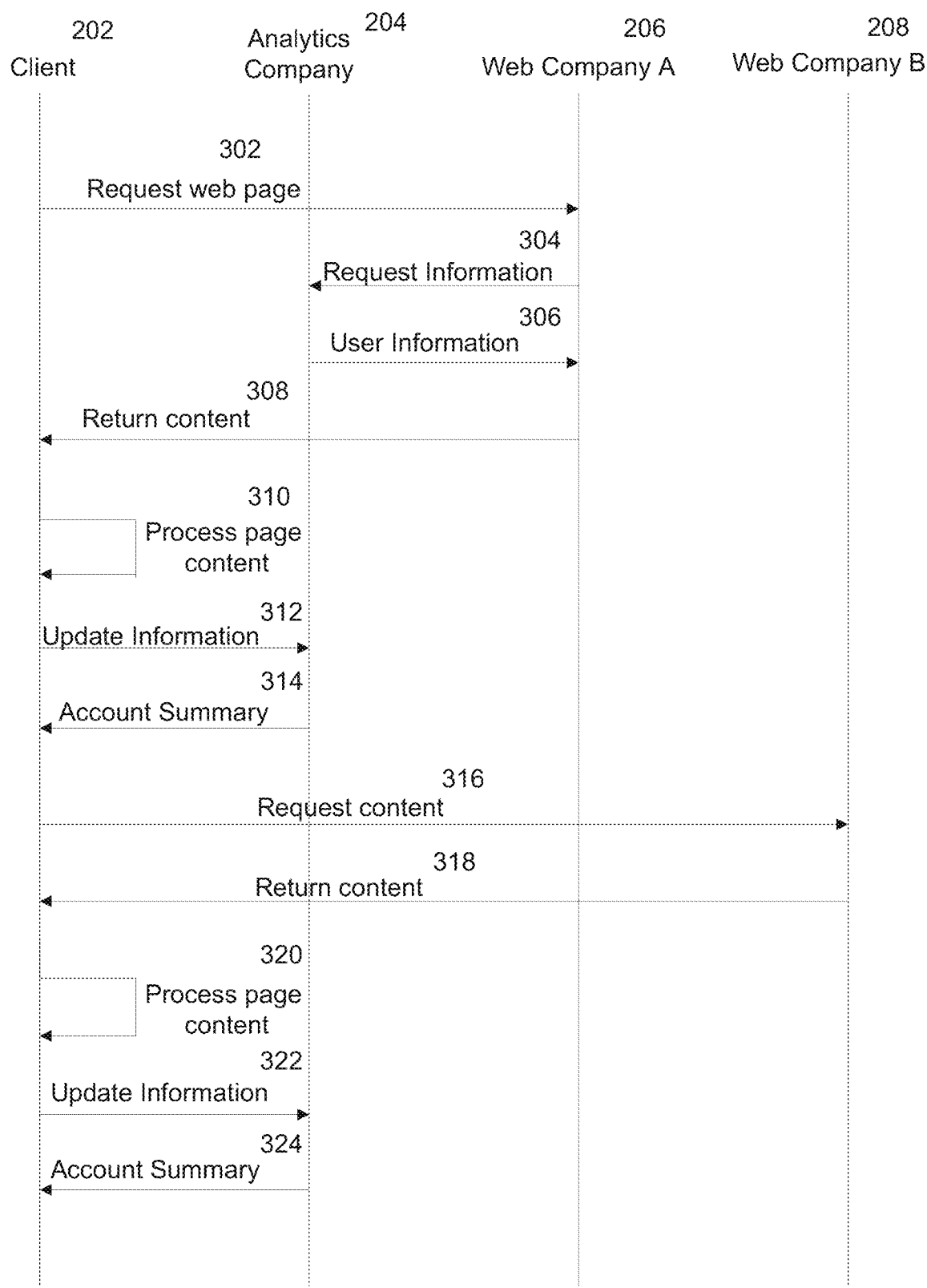
FIG. 3 is a transaction flow diagram illustrating an example method of sharing personal information via a personal data sharing service that maintains personal data in accordance with various embodiments.

FIG. 3 is a transaction flow diagram illustrating an example method of sharing personal information via a personal data sharing service that maintains personal data in accordance with various embodiments. As shown in this example, a user may browse to a web page of the web company 206 via a client device 202.

The client device 202 may access a personal data sharing configuration that has been established at the web browser (or associated plug-in). In some embodiments, the client device 202 may look up web company A 206 in its list of web companies to ascertain whether the web company 206 has an established relationship with the analytics company 204. In this example, the web company 206 has an established relationship with the analytics company 204.

A web browser of the client device 202 may compose a request for a web page of the web company web site 206 based, at least in part, on the personal data sharing configuration and send the request at 302 to the web company 206. More particularly, the request may include a Hypertext Transfer Protocol (HTTP) request.

The request may include at least one user identifier and an indication that the client device is authorizing the web site 206 to obtain one or more personal information items associated with the user identifier from an entity that maintains personal information associated with users. In this example, the entity is the analytics company 204. While a single analytics company is shown in this example, multiple analytics companies are also possible. Thus, the request may further include an identifier of the analytics company.

In some embodiments, the user identifier that is transmitted in the request (and other communications with web sites) is encrypted or otherwise obfuscated. In some implementations, the user identifier that is transmitted may be dynamic rather than static. More particularly, the user identifier may be modified on a per request basis or over time. In other implementations, the user identifier may be used specifically for the purpose of sharing personal information. In other words, the user identifier that is provided to web companies may be a substitute identifier that is mapped to the actual user identifier. Through the use of a substitute identifier rather than the actual user identifier, the system may prevent web companies from independently tracking users.

In addition, the request may include an indication of personal information item(s) that the client device is authorizing to be obtained from the analytics company. For example, the request may identify type(s) of personal information items (e.g. age, gender, browsing history, etc.) that the client device 202 is authorizing the web site 206 to obtain from the analytics company. More particularly, the client device 202 may access its data sharing configuration to ascertain the type(s) of information the user and/or client device 202 is willing to share with the web site 206.

As one example, the client device 202 may append a header to the request, where the header includes the user identifier and the indication of the personal information item(s) that the client device is authorizing the web site to obtain from the entity. The header may further identify the analytics company. In one implementation, the request includes one or more key(s), token(s), or value(s) that indicate the personal information item(s) that the client device has authorized the web site to obtain from the entity. For example, a single key, token, or value may represent one or more types of personal information items. As another example, each key, token, or value may represent a corresponding type of information item. In some embodiments, the key(s), token(s), or value(s) may be encrypted.

A server associated with the web company web site 206 receives the request from the client device and transmits an information request at 304 to the analytics company 204. The information request may include the user identifier and an indication that the client device has authorized the web company 206 to obtain personal information item(s) associated with the user identifier from the analytics company 204. The information request may also include a company identifier of the web company 206 such as that described above. The indication that the client device 202 has authorized personal information item(s) associated with the user identifier to be obtained from the analytics company 204 may include the key(s), token(s) or value(s) received at 302. For example, a server of the web company 206 may decrypt an encrypted token or encrypted value received at 302 and transmit a result of the decryption to the analytics company 204 as proof that the client device 202 has authorized the web company 206 to fetch personal information item(s) associated with the user identifier from the analytics company 204. As another example, a server of the web company 206 may transmit one or more encrypted tokens, keys, or values to the analytics company 204, which the analytics company 204 may decrypt.

The analytics company 204 may determine whether the web company 206 is authorized to obtain the personal information item(s) associated with the user from the analytics company 204 based, at least in part, on the tokens, keys, or values. More particularly, the analytics company 204 may look up the tokens, keys, or values to ascertain the personal information item(s) that the user has authorized to be obtained by the web company 206 from the analytics company 204. For example, a list of tokens, keys, or values may be associated with the user identifier(s), client device 202, and/or web company 206. The analytics company may provide the requested personal information item(s) associated with the user identifier(s) to the web company 206 at 306. Upon receiving the personal information item(s), the web company 206 may receive and store the personal information item(s) in association with the user identifier(s) and/or client device 202.

The web company 206 may transmit content to the client device 202 in response to the request for the web page at 308. More particularly, the web company 206 may transmit a HTTP response including page content to the client device 202. The client device 202 may process the page content at 310. For example, the user may view or interact with the page content by scrolling or clicking on various objects in the page content.

In some embodiments, the web browser or associated plug-in may be configured to transmit personal information updates to the analytics company 204. For example, the client device 202 may update the personal information maintained by the analytics company 204 by transmitting information pertaining to recent online activities by the client device 202 at 312 to the analytics company 204. For example, the information may include one or more personal information item(s). The analytics company 204 may update the user profile associated with the user(s) and/or the client device 202 to include the personal information item(s) received from the client device (202).

A user of the client device 202 may obtain a benefit from the analytics company 204 in exchange for the personal information item(s) obtained by the web company 206 from the analytics company 204. For example, the analytics company 204 may update the corresponding account to reflect the information recently received from the client device 202. The analytics company 204 may transmit an account summary to the client device 202 at 314. The account summary may summarize the amount and/or type of personal data shared with other web companies, recent online activities of the client device 202 such as the amount and/or type of personal data shared with the web company 206, total benefits accrued, and/or benefits accrued as a result of sharing the personal data with the web company 206.

The analytics company 204 may offer various benefits for shared personal data. Such benefits may include monetary compensation, coupons or other discounts, products, services such as personalized content, and/or access to various online services.

The user may then browse to a web page of web company B 208 via the client device 202. The client device 202 may compose a web page request according to a configuration established at the web browser or associated plug-in. In some embodiments, the client device 202 may look up web company B 208 in its list of web companies to ascertain whether the web company 208 has an established relationship with the analytics company 204. Since the web company 208 does not have an established agreement with the analytics company 204, the client device 202 may compose a standard web page request.

Where a client device 202 requests content at 316 from the web company B 208, which does not have an established agreement with the analytics company 204, the web company 208 returns the requested content at 318. Due to the lack of a contractual agreement with the analytics company 204, the web company B 208 will be unable to fetch personal information from the analytics company 204.

The client device 202 may process the page content at 320 to display the web page content via a display. The client device 202 may also send updated personal information summarizing its recent activities to the analytics company 204 at 322. For example, the client device 202 may send personal information item(s) to the company 204. The analytics company 204 may update the pertinent user profile(s). However, in this case, since the web company 208 does not have an agreement with the analytics company 204, the user of the client device 202 will not benefit from this particular transaction. Of course, since the personal information maintained by the analytics company 204 has been updated, this personal information may be later provided to another web company that does have a contractual agreement with the analytics company 204.

The analytics company 204 may provide an account summary at 324 to the client device 202. More particularly, the account summary may indicate that the personal information has been updated. The account summary may also indicate that benefits were not accrued as a result of communicating with the web company 208. More particularly, the client device 202 may not have the knowledge of which web companies have contractual arrangements with the analytics company 204. Therefore, it may be beneficial to notify the client device 202 that benefits were not accrued as a result of the most recent transaction.

Figure 4:
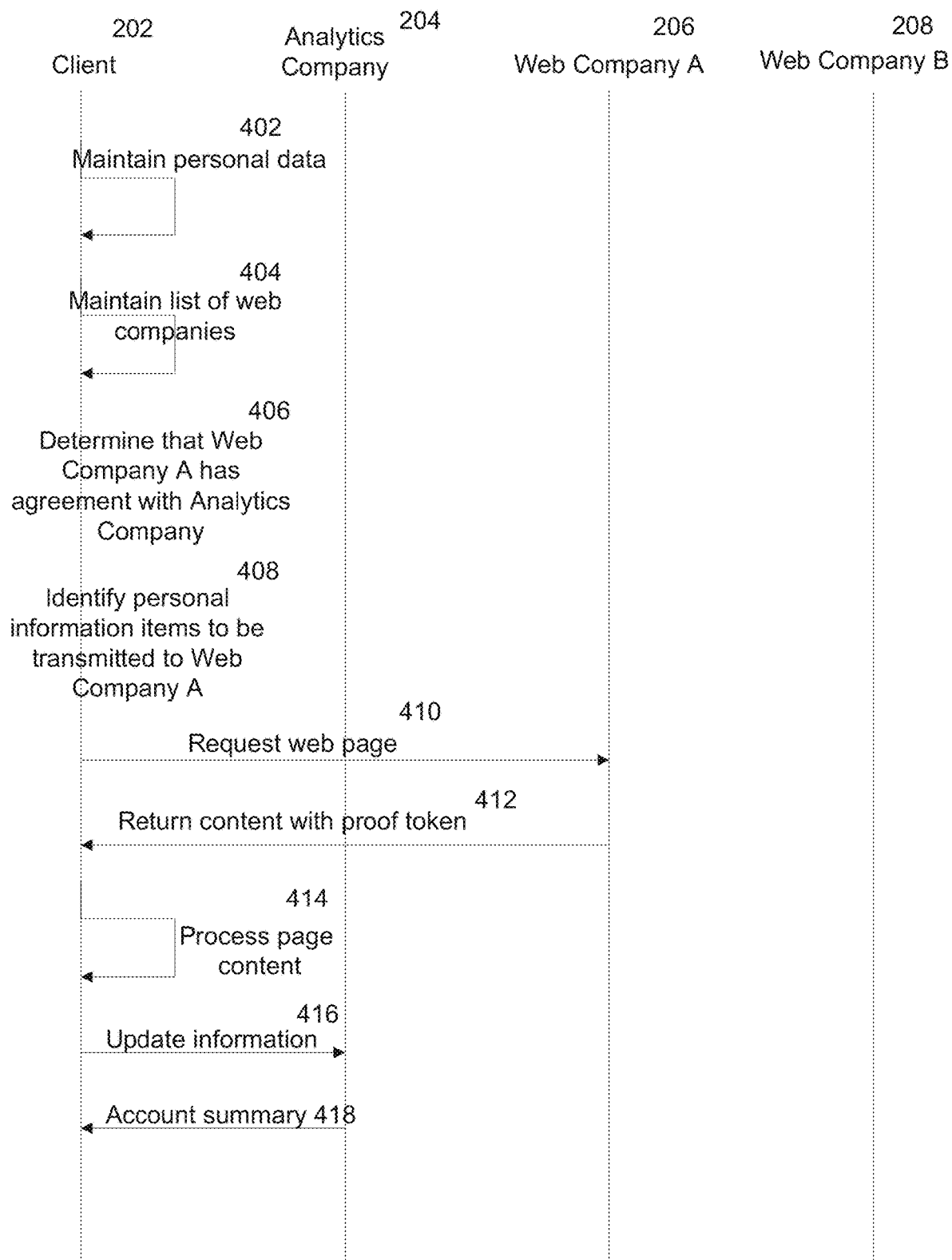
FIG. 4 is a transaction flow diagram illustrating an example method of sharing personal information maintained at the client device in accordance with various embodiments.

In accordance with various embodiments, a client device that has an established agreement with an analytics company may collect and maintain its own personal data, which it may provide to various web companies. FIG. 4 is a transaction flow diagram illustrating an example method of sharing personal information maintained at the client device in accordance with various embodiments. The client device 202 may maintain personal data associated with user(s) of the client device 202 in a local cache of the client device 202 as shown at 402. In some embodiments, the personal data maintained at the client device 202 may include at least a subset of the personal data maintained by the analytics company 404.

In addition, the client device 202 may maintain a list of web companies that have a contractual agreement with the analytics company 204, as shown at 404. The list may further indicate the types of personal information items that each of the listed web companies wants. For example, the list may indicate that the web company 206 has an agreement with the analytics company 204 and the web company 206 wishes to receive a user's age, gender, and web browsing history. In some embodiments, the list may include, for each of the web companies in the list, a corresponding set of keys/tokens/values that represent the desired types of personal information items of the respective web company.

The web browser or associated plug in may aggregate the list based on previous communications with the web company 206 (e.g., web page requests). In some embodiments, the client device 202 may transmit a query to the analytics company 204 to obtain a list of web companies with which the analytics company 204 has a relationship. The analytics company 204 may respond to the query with the list of web companies and type(s) of personal information items requested by each of the web companies.

Prior to sending a web page request to the web company 206, the client device 202 may determine at 406 that the web company 206 has an established relationship with the analytics company 204. In addition, the client device 202 may identify at 408 the type(s) of personal information items that the web company 206 wishes to receive from client devices. More particularly, the client device 202 may look up the web company 206 in the list maintained by the client device 202. From this list, the client device 202 may also identify the type(s) of personal information items that the web company 206 would like to receive.

In some embodiments, the client device 202 may receive a communication from the web company 206 that indicates that the web company 206 has an established relationship with the analytics company 204 and indicates the type(s) of personal information items that the web company 206 would like to receive. The client device 202 may transmit a query to the analytics company 204 to confirm that the web company 206 has an established relationship with the analytics company 204. The list maintained at the client device 202 may be updated accordingly.

In addition, a web browser of the client device 202 may access the personal data sharing configuration that was previously established at the web browser (or associated plug-in) to ascertain the type(s) of information the user is willing to send to various web companies. Therefore, the client device 202 may identify those personal information items that the user is willing to send and the web company 206 is interested in receiving.

The client device 202 may compose a request for a web page based, at least in part, on the personal data sharing configuration and transmit the request, a user identifier, and one or more personal information items associated with the user identifier at 410. In some embodiments, the request may include the user identifier, as well as the personal information items. For example, the browser may compose the request by appending a header or extension to the request that includes the user identifier and the personal information items associated with the user identifier.

The web company 206 may transmit the requested page content to the client device 202 at 412. In addition, the web company 206 may transmit a token that indicates that the personal information items were received by the web company 206 from the client device 202. For example, the token may include a value such as one or more alphanumeric characters. To prevent fraudulent generation of tokens, the token may include an encrypted value. The client device 202 may later provide the token to the web company 204 to prove that it has provided personal information items to the web company 206.

The client device 202 may process the page content at 414 to display the web page content. In addition, the client device 202 may send updated personal information summarizing its recent activities to the analytics company 204 at 416. More particularly, the client device 202 may provide the token to the analytics company 204 as proof that that it has provided personal information items to the web company 206. The token may further indicate the type(s) of personal information and/or quantity of personal information that the client device 202 has provided to the web company 206. In addition, the client device 202 may transmit one or more personal information item(s) to the analytics company 204. The analytics company 304 may update the pertinent user profile(s) with the updated personal information. More particularly, the analytics company 204 may update the user profile(s) according to the token to update the account balance to reflect the personal information items recently provided by the client device 202 to the web company 206.

The analytics company 204 may also provide an account summary at 418 to the client device 202. More particularly, the account summary may indicate that the personal information has been updated. In addition, the account summary may indicate the amount and/or type of personal data shared with other web companies, the amount and/or type of personal data that has recently been shared with the web company 206, the account balance indicating total benefits accrued, and/or benefits accrued as a result of the sharing of the personal data with the web company 206. In this manner, a user of the client device 202 may obtain compensation from the analytics company 204 in exchange for providing personal information items to the web company 206. Therefore, an analytics company may reward users of client devices for sharing their personal information without requiring the analytics company to collect or maintain the personal information.

Benefits provided to a user for sharing his or her personal information may be determined based upon various factors including, but not limited to, the number of web companies with which the user shares his or her personal data, the number of different types of personal information items shared with corresponding web companies, the type(s) of personal information items shared with corresponding web companies, and/or the quantity of personal information shared with other web companies. For example, where the quantity of personal information may be greater for a user that has a more significant or lengthy browsing history. The user may obtain or redeem the benefits that he or she has accrued. In some embodiments, the user may obtain or redeem the benefits from the analytics company 204 by communicating with the personal data sharing service of the analytics company web site.

In the embodiments described above, the client device 202 receives benefits from the analytics company 204. However, in other embodiments, the benefits may be received from the web company 206 that has received or obtained the personal data. For example, the web company 206 may establish an agreement with the analytics company 204 that it will compensate users directly for user data that it receives from client devices and/or obtains from the analytics company.

The above-described examples illustrate the sharing of personal information as the user browses to various web sites. In other embodiments, personal information may be shared via a data sharing application installed on the client device 202. Through the data sharing application, the client device 202 may communicate directly with the analytics company 204 and/or various web companies. Thus, a web company may request personal information from the client device 202 via the data sharing application. Similarly, the client device 202 may provide personal information to the web company via the data sharing application.

Network Environment

Implementations are contemplated in which users interact with a diverse network environment. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The disclosed embodiments may be implemented via a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The disclosed embodiments may also be implemented via a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

In some embodiments, the network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or may be capable of processing or storing signals, such as in memory as physical memory states, may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, personal information and other content may be identified and provided via a content server. A content server may comprise a device that is configured to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
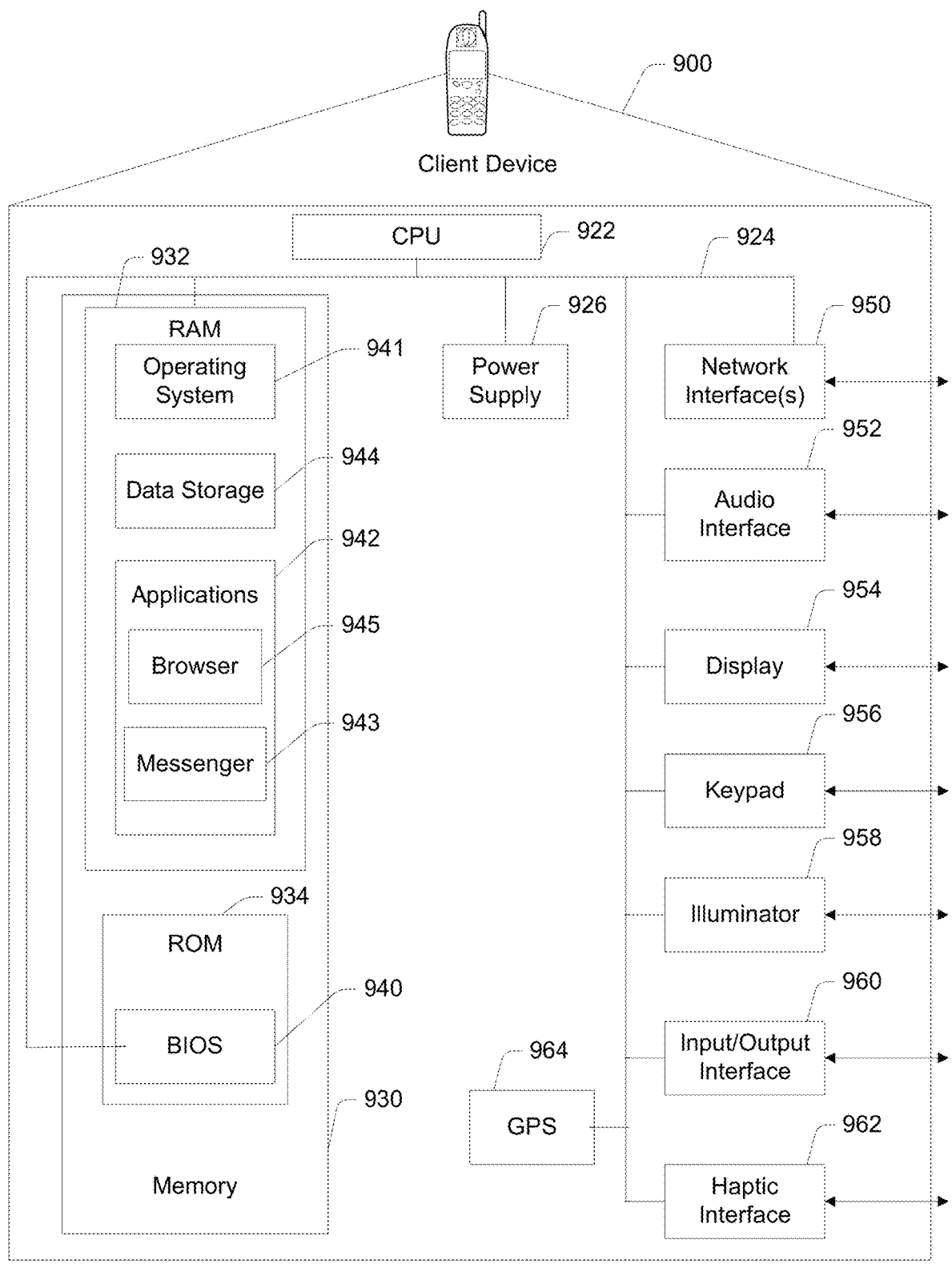
FIG. 5 is a schematic diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A client device, comprising:
one or more processors; and
one or more memories storing thereon computer-readable instructions configured to:
access a personal data sharing configuration that has been established in at least one of a browser or a plug-in associated with the browser, the personal data sharing configuration pertaining to sharing of personal information of one or more users of the client device with other web sites;
search a list of web sites maintained at the client device to determine whether a web site has an established relationship with a personal data sharing system;
responsive to determining that the web site has an established relationship with the personal data sharing system that provides compensation in exchange for personal information shared by the client device with the web site, compose, using the client device, a request for a web page associated with the web site based, at least in part, on the personal data sharing configuration such that the request indicates whether permission to obtain one or more personal information items associated with the one or more users from the personal data sharing system is granted to the web site, wherein the composing, using the client device, comprises using the personal data sharing configuration to ascertain at least one type of information the one or more users of the client device are willing to send to one or more entities;
transmit the request for the web page to a server of the web site;
receive content from the server of the web site in response to the request for the web page;
search the list of web sites maintained at the client device to determine whether a second web site has an established relationship with the personal data sharing system;
responsive to determining that the second web site does not have an established relationship with the personal data sharing system that provides compensation in exchange for personal information shared by the client device with the second web site, compose, using the client device, a second request for a second web page associated with the second web site such that the second request is not indicative of whether permission to obtain one or more personal information items associated with the one or more users from the personal data sharing system is granted to the second web site;
transmit the second request for the second web page to a second server of the second web site; and
receive second content from the second server of the second web site in response to the second request for the second web page.

2. The client device as recited in claim 1, wherein the computer-readable instructions are configured to:
provide a graphical user interface including a representation of a plurality of types of personal information items, the plurality of types of personal information items being selectable by a user.

3. The client device as recited in claim 2, wherein the computer-readable instructions are configured to:
receive a selection of a subset of the plurality of types of personal information items.

4. The client device as recited in claim 3, wherein the computer-readable instructions are configured to:

store an indication of the subset of the plurality of types of personal information items in association with a first web domain such that the personal data sharing configuration indicates the subset of the plurality of types of personal information items in association with the first web domain.

5. The client device as recited in claim 4, wherein the computer-readable instructions are configured to:
store a second indication of a second subset of the plurality of types of personal information items in association with a second web domain such that the personal data sharing configuration indicates the second subset of the plurality of types of personal information items in association with the second web domain.

6. The client device as recited in claim 5, wherein the first web domain is associated with the web site, and the composing the request for the web page associated with the web site is performed based upon the subset of the plurality of types of personal information items.

7. The client device as recited in claim 1, wherein the at least one type of information, that the one or more users are ascertained to be willing to send to the one or more entities using the personal data sharing configuration, comprising at least one of an identity of a visited web site, time spent on the visited web site, a product purchased via the visited web site or a summary of personal data transmitted by the client device to the visited web site.

8. A non-transitory computer readable storage medium having stored thereon computer program instructions that when executed cause performance of operations, the operations comprising:
accessing a personal data sharing configuration that has been established in at least one of a browser or a plug-in associated with the browser, the personal data sharing configuration pertaining to sharing of personal information of one or more users of a client device with other web sites;
searching a list of web sites maintained at the client device to determine whether a web site has an established relationship with a personal data sharing system;
responsive to determining that the web site has an established relationship with the personal data sharing system that provides compensation in exchange for personal information shared by the client device with the web site, composing, using the client device, a request for a web page associated with the web site based, at least in part, on the personal data sharing configuration such that the request indicates whether permission to obtain one or more personal information items associated with the one or more users from the personal data sharing system is granted to the web site, wherein the composing, using the client device, comprises using the personal data sharing configuration to ascertain at least one type of information the one or more users of the client device are willing to send to one or more entities;
transmitting the request for the web page to a server of the web site;
receiving content from the server of the web site in response to the request for the web page;
searching the list of web sites maintained at the client device to determine whether a second web site has an established relationship with the personal data sharing system;
responsive to determining that the second web site does not have an established relationship with the personal data sharing system that provides compensation in exchange for personal information shared by the client device with the second web site, composing, using the client device, a second request for a second web page associated with the second web site such that the second request is not indicative of whether permission to obtain one or more personal information items associated with the one or more users from the personal data sharing system is granted to the second web site;
transmitting the second request for the second web page to a second server of the second web site; and
receiving second content from the second server of the second web site in response to the second request for the second web page.

9. The non-transitory computer readable storage medium as recited in claim 8, wherein the operations comprise:
providing a graphical user interface including a representation of a plurality of types of personal information items, the plurality of types of personal information items being selectable by a user.

10. The non-transitory computer readable storage medium as recited in claim 9, wherein the operations comprise:
receiving a selection of a subset of the plurality of types of personal information items.

11. The non-transitory computer readable storage medium as recited in claim 10, wherein the operations comprise:
storing an indication of the subset of the plurality of types of personal information items in association with a first web domain such that the personal data sharing configuration indicates the subset of the plurality of types of personal information items in association with the first web domain.

12. The non-transitory computer readable storage medium as recited in claim 11, wherein the operations comprise:
storing a second indication of a second subset of the plurality of types of personal information items in association with a second web domain such that the personal data sharing configuration indicates the second subset of the plurality of types of personal information items in association with the second web domain.

13. The non-transitory computer readable storage medium as recited in claim 12, wherein the first web domain is associated with the web site, and the composing the request for the web page associated with the web site is performed based upon the subset of the plurality of types of personal information items.

14. The non-transitory computer readable storage medium as recited in claim 8, wherein the at least one type of information, that the one or more users are ascertained to be willing to send to the one or more entities using the personal data sharing configuration, comprising at least one of an identity of a visited web site, time spent on the visited web site, a product purchased via the visited web site or a summary of personal data transmitted by the client device to the visited web site.

15. A method, comprising:
accessing a personal data sharing configuration that has been established in at least one of a browser or a plug-in associated with the browser, the personal data sharing configuration pertaining to sharing of personal information of one or more users of a client device with other web sites;
searching a list of web sites maintained at the client device to determine whether a web site has an established relationship with a personal data sharing system;
responsive to determining that the web site has an established relationship with the personal data sharing system that provides compensation in exchange for personal information shared by the client device with the web site, composing, using the client device, a request for a web page associated with the web site based, at least in part, on the personal data sharing configuration such that the request indicates whether permission to obtain one or more personal information items associated with the one or more users from the personal data sharing system is granted to the web site, wherein the composing, using the client device, comprises using the personal data sharing configuration to ascertain at least one type of information the one or more users of the client device are willing to send to one or more entities;

transmitting the request for the web page to a server of the web site;

receiving content from the server of the web site in response to the request for the web page;

searching the list of web sites maintained at the client device to determine whether a second web site has an established relationship with the personal data sharing system;

responsive to determining that the second web site does not have an established relationship with the personal data sharing system that provides compensation in exchange for personal information shared by the client device with the second web site, composing, using the client device, a second request for a second web page associated with the second web site such that the second request is not indicative of whether permission to obtain one or more personal information items associated with the one or more users from the personal data sharing system is granted to the second web site;

transmitting the second request for the second web page to a second server of the second web site; and receiving second content from the second server of the second web site in response to the second request for the second web page.

16. The method as recited in claim 15, comprising:

providing a graphical user interface including a representation of a plurality of types of personal information items, the plurality of types of personal information items being selectable by a user.

17. The method as recited in claim 16, comprising:

receiving a selection of a subset of the plurality of types of personal information items.

18. The method as recited in claim 17, comprising:

storing an indication of the subset of the plurality of types of personal information items in association with a first web domain such that the personal data sharing configuration indicates the subset of the plurality of types of personal information items in association with the first web domain.

19. The method as recited in claim 18, comprising:

storing a second indication of a second subset of the plurality of types of personal information items in association with a second web domain such that the personal data sharing configuration indicates the second subset of the plurality of types of personal information items in association with the second web domain.

20. The method as recited in claim 19, wherein the first web domain is associated with the web site, and the composing the request for the web page associated with the web site is performed based upon the subset of the plurality of types of personal information items.

* * * * *